US008414739B2

(12) United States Patent
Kimura et al.

(10) Patent No.: US 8,414,739 B2
(45) Date of Patent: Apr. 9, 2013

(54) FILLED PAPER AND METHOD OF MANUFACTURING THE SAME

(75) Inventors: Yoshiharu Kimura, Kakogawa (JP); Takao Sezaki, Kakogawa (JP); Yuko Iijima, Tokyo (JP); Koji Kutsuwa, Tokyo (JP)

(73) Assignees: Harima Chemicals, Inc., Hyogo (JP); Nippon Paper Industries Co., Ltd., Tokyo (JP)

( * ) Notice: Subject to any disclaimer, the term of this patent is extended or adjusted under 35 U.S.C. 154(b) by 0 days.

(21) Appl. No.: 11/886,452

(22) PCT Filed: Mar. 16, 2006

(86) PCT No.: PCT/JP2006/305210
§ 371 (c)(1),
(2), (4) Date: Sep. 17, 2007

(87) PCT Pub. No.: WO2006/100996
PCT Pub. Date: Sep. 28, 2006

(65) Prior Publication Data
US 2009/0020250 A1 Jan. 22, 2009

(30) Foreign Application Priority Data
Mar. 18, 2005 (JP) .................................. 2005-080365

(51) Int. Cl.
*D21H 17/24* (2006.01)
*D21H 17/55* (2006.01)
*D21H 17/69* (2006.01)
*D21H 21/16* (2006.01)
*D21H 21/18* (2006.01)

(52) U.S. Cl.
USPC ........ 162/168.3; 162/158; 162/175; 162/177; 162/181.1; 162/181.2; 162/185; 106/400; 106/461; 106/463; 106/464; 106/465

(58) Field of Classification Search .................. 106/400, 106/401, 461, 463, 464; 162/185
See application file for complete search history.

(56) References Cited

U.S. PATENT DOCUMENTS

| 3,639,208 | A | * | 2/1972 | Varveri et al. | 162/168.4 |
|---|---|---|---|---|---|
| 4,174,998 | A | * | 11/1979 | Shiel | 162/168.3 |
| 4,272,297 | A | * | 6/1981 | Brooks et al. | 106/465 |
| 4,925,530 | A | * | 5/1990 | Sinclair et al. | 162/164.1 |
| 4,943,349 | A | * | 7/1990 | Gomez | 162/158 |
| 5,017,268 | A | * | 5/1991 | Clitherow et al. | 162/146 |
| 5,989,391 | A | * | 11/1999 | Watanabe et al. | 162/164.6 |
| 6,372,806 | B1 | * | 4/2002 | Keiser et al. | 516/82 |
| 2003/0127209 | A1 | * | 7/2003 | Sandberg et al. | 162/164.6 |

FOREIGN PATENT DOCUMENTS

| JP | 55-163298 | 12/1980 |
|---|---|---|
| JP | 56-20699 | 2/1981 |
| JP | 59-26595 | 2/1984 |
| JP | 60-119299 | 6/1985 |
| JP | 9-505099 | 5/1997 |
| JP | 10-60794 | 3/1998 |
| JP | 10-505883 | 6/1998 |
| JP | 2000-129589 | 5/2000 |
| JP | 2001-81697 | 3/2001 |
| JP | 2004-18323 | 1/2004 |
| JP | 2004-100119 | 4/2004 |

OTHER PUBLICATIONS

Smook, Gary A., Handbook of Pulp and Paper Terminology, Angus Wilde Publications, 1990, p. 314.*

* cited by examiner

*Primary Examiner* — Matthew Daniels
*Assistant Examiner* — Dennis Cordray
(74) *Attorney, Agent, or Firm* — Clark & Brody

(57) ABSTRACT

There is provided a filled paper containing a coated filler obtained by coating a filler with a acrylamide copolymer (composite PAM) comprising (A) an anionic polysaccharide and (B) a cationic and/or an amphoteric acrylamide copolymer. The composite PAM is obtained, for example, by mixing the component (A) and the component (B). Since the filler is treated with a combination of the components (A) and (B) different from each other in charge properties and structure, suitable coagulation effect can be attained and the coated filler has excellent affinity for pulp slurry. Therefore, even in the case of a highly filled paper, a large paper strengthening effect can be attained by using a small amount of the chemical agent.

7 Claims, No Drawings

FILLED PAPER AND METHOD OF MANUFACTURING THE SAME

TECHNICAL FIELD

The present invention relates to a filled paper and a method of manufacturing the same, which is capable of improving paper strength efficiently with small amounts of chemical agent by incorporating filler coated with a composite acrylamide copolymer.

BACKGROUND ART

Recently, from the viewpoint of environmental maintenance, resource conservation and garbage reduction, the lighter weight and lower weighing of paper are demanded, and therefore the incorporation of various types of fillers at a high proportion of content has been made to improve the brightness, opacity and printability of the paper.

However, in the paper incorporating large amounts of the fillers, the proportion of pulp is relatively lowered, and the fillers inhibit the hydrogen bond between pulp fibers, thus causing a large decreasing in paper strength. In order to retain the paper strength, there are used chemical agents such as paper strength enhancing agents, for example, starch and polyacrylamide (herein after referred to as "PAM"). In order to obtain a large paper strength improving effect, it is necessary to increase the amount of the agents to be added. Under this condition, there may arise the problem such as a lowering of retention, a lowering of sizing property, or contamination.

The following can be referred to as related art where filler subjected to aggregation, adsorption, or coating with a specific component is incorporated into paper for the purposes of paper strength enforcement and the like.

(1) Patent Document 1

It is disclosed that for the purpose of manufacturing a filled paper that reduces deteriorations in paper strength and intensity due to the incorporation of fillers, an acrylic latex is added to a filler suspension to form the agglomerate of fillers in advance, and this is then added to a pulp suspension (that is, the acrylic latex is not added to suspension composed of pulp and fillers) (refer to claim 1, and paragraphs "0001" and "0004"). The acrylic latex is acrylic monomer alone such as (metha)acrylic acid, alkyl(metha)acrylate, hydroxyl group-containing alkyl(metha)acrylate, or latex manufactured by adding other monomer (styrenes, unsaturated dicarboxylic acid, etc), which can be copolymerized with these acrylic monomers (refer to paragraphs "0012" and "0014").

(2) Patent Document 2

It is disclosed to manufacture paper with high content of filler by wet papermaking using composite particles obtained by coating process of precipitated calcium carbonate with branched amphoteric acrylamide copolymer (PAM) of a specific molecular weight, for the purposes of reducing deterioration in paper strength due to the incorporation of fillers (refer to claim 1, and paragraphs "0001," "0005," and "0006").

(3) Patent Document 3

It is disclosed to use, as filler, one obtained by allowing amphoteric PAM to be adsorbed on calcium carbonate (salt formation, electrostatic coupling, physical adsorption, etc), for the purposes of obtaining a filled paper using calcium carbonate as filler (refer to the scope of claims, and the upper right column to the lower right column on page 2).

(4) Patent Document 4

It is disclosed to manufacture paper having brightness by using inorganic filler obtained by treating an inorganic material such as calcium carbonate with a cellulose derivative such as sodium carboxymethyl cellulose (CMC) (refer to claims 1 to 9, pages 5 to 6, and examples 1A to 1H).

(5) Patent Document 5

It is disclosed to perform wet papermaking by allowing filler to be coagulated with cationic starch and cationic guar gum, and then adding the coagulated filler to pulp slurry, for the purposes of preventing paper strength deterioration, while incorporating a large amount of calcium carbonate (refer to claims 1 to 2, and paragraphs "0004," "0008" to "0013," and "0024").

(6) Patent Document 6

It is disclosed that wet papermaking is made by premixing ground calcium carbonate with cationic modified starch solution, and adding this to pulp slurry (refer to the scope of claims, and page 2, the upper right to the lower right column). It is also described that in this case, anionic polymer such as polyacrylate may be used together with cationic modified starch (refer to the upper left column on page 3).

(7) Patent Document 7

It is described to add a preliminary coagulated filler to pulp slurry (refer to claim 1, and paragraphs 8 and 15), and as flocculant, there are exemplified water-soluble vinyl polymer, gum, PAM, aluminium sulfate, anionic starch derivative, and the like (refer to paragraphs "0016" to "0018").

Patent document 1: Japanese Unexamined Patent Publication No. 2004-100119

Patent document 2: Japanese Unexamined Patent Publication No. 2004-18323

Patent document 3: Japanese Unexamined Patent Publication No. 59-26595:

Patent document 4: Japanese Unexamined Patent Publication No. 9-505099:

Patent document 5: Japanese Unexamined Patent Application Publication No. 10-60794:

Patent document 6: Japanese Unexamined Patent Application Publication No. 60-119299

Patent document 7: Japanese Unexamined Patent Publication No. 2000-129589

DISCLOSURE OF THE INVENTION

Problems to be Solved by the Invention

In the above patent documents 1, and 4 to 6, the single ionic agent is used, and therefore the charge balance of the treatment system is determined only by the amount of a treating agent, and the range of the optimum treatment condition is small in terms of the charge balance. Departure from the abovementioned condition results in poor efficiency of adsorption of the treating agent onto the filler. Although the above patent documents 2 and 3 use the amphoteric PAM in the filler treatment, when the concentration of treatment is not under an appropriate condition, and it cannot be adsorbed on the surface of the filler (calcium carbonate), it is difficult for the agent to effectively function as the treating agent.

Although the treating agent used in the above patent document 2 is the amphoteric branched PAM, the principal chain of the polymer is structurally soft and brought into a compact adsorption form at the time of adsorption. Hence, there is a limit of the range where the branched PAM functions, and it cannot be said that the paper improving effect is sufficient.

If the treating agents exemplified in the above patent documents 1 to 7 are used in a large amount for obtaining higher paper strength improving effect, the improvement of paper strength is saturated to cause a lowering of ash content. Further, even if the paper strength is improved by adding internal agents (cationic starch, and PAM type paper strength agent), increasing the amount of addition may cause deteriorations in ash content and sizing property (refer to test examples to be described later).

Accordingly, the advantage of the present invention is to efficiently improve the dry strength of paper with high content of filler, by adding small amounts of agents such as paper strength enhancing agent.

Means for Solving the Problems

The present inventors have made lots of research effort of the development of a treating agent, which is easy to maintain charge balance and permits setting of a wide treating concentration range, instead of an ionic treating agent such as acrylic latex or CMC disclosed in the abovementioned patent documents. As the result, the present invention has been found that a composite acrylamide copolymer (herein after referred to as a "composite PAM") comprising (A) an anionic polysaccharide, and (B) a cationic and/or an amphoteric acrylamide copolymer forms a polyion complex obtain able from a combination of polymers having different charge characteristics and structures, thereby enabling a wide applicable range of characteristics (aggregation characteristic and paper strength improving characteristic), which cannot be obtained from an individual treating agent alone.

Specifically, a filled paper of the invention contains a coated filler obtained by coating process of filler with a composite PAM comprising (A) an anionic polysaccharide, and (B) a cationic and/or an amphoteric acrylamide copolymer.

In the present invention, the composite PAM is a mixture of the component (A) and the component (B), or alternatively a product obtained by copolymerization reaction of monomers constituting the component (B) in the presence of the component (A).

The anionic polysaccharide are preferably at least one of anionic celluloses such as carboxylmethyl celluloses, alginic acids, anionic starch, and anionic gums.

The weight ratio of the component (A) and the component (B) is preferably A/B=2 to 45/98 to 55. It is preferable to use calcium carbonate as the filler. The content of the coated filler in the filled paper is preferably 5 to 40% by weight.

In the present invention, it may further contain at least one selected from cationic starch and acrylamide copolymer, as an internal additive.

A method of manufacturing a filled paper according to the present invention includes the step of obtaining a coated filler by adding to filler slurry an aqueous solution of a composite PAM comprising (A) an anionic polysaccharide, and (B) a cationic and/or an amphoteric acrylamide copolymer, the coated filler being coated with the composite PAM; and the step of performing wet papermaking by adding the coated filler to pulp slurry.

Other method of manufacturing a filled paper according to the present invention includes the step of obtaining a coated filler by separating adding to filler slurry (A) an anionic polysaccharide and (B) a cationic and/or an amphoteric acrylamide copolymer, the coated filler being coated with a composite PAM; and the step of performing wet papermaking by adding the coated filler to pulp slurry.

Effects of the Invention

The abovementioned composite PAM is composed of (A) an anionic polysaccharide, and (B) a cationic and/or an amphoteric acrylamide copolymer. The polysaccharide enables formation of the spreading structure of a high molecular weight, and the cationic and hydrophilic characteristics of the PAM enable formation of a polyion complex having the characteristics of the two. This permits exhibition of an appropriate aggregation effect to filler particles such as calcium carbonate, and a high affinity to the pulp slurry.

In cases where internal agents such as cationic starch and PAM type dry strength agent are added to the pulp slurry containing filler treated with the composite PAM, synergistic effect can be happened without inhibiting the respective effects of the filler and the agents, so that a large paper strength improving effect can be obtained by smaller amounts of the agents.

That is, the coated filler, which is obtained by treating filler such as calcium carbonate with the composite PAM formed of the combined specific two components having different charge characteristics, has an appropriate aggregation effect and an excellent affinity with the pulp slurry, or alternatively a good compatibility with agents (paper strength enhancement agent etc) to be incorporated into the pulp slurry. This also enables paper with high content of filler to exhibit a large paper enhancement effect by small amounts of the agents.

PREFERRED EMBODIMENTS FOR CARRYING OUT THE INVENTION

The filled paper of the present invention contains filler treated with a composite PAM, which can be manufactured as follows. That is, after the filler is coated with the composite PAM by adding to filler slurry the solution of the composite PAM composed of an anionic polysaccharide (A) and a PAM type component (B), or alternatively by separately: adding to filler slurry the two components (A) and (B), wet papermaking is carried out by adding the coated filler to pulp slurry.

The abovementioned composite PAM is composed of (A) the anionic polysaccharide, and (B) the cationic and/or the amphoteric PAM. In this case, an anionic PAM is excluded from the component (B).

As the abovementioned anionic polysaccharide (A), it is possible to mix and use one or more than one types of derivatives such as starches incorporating, as an acidic substituent, carboxyl group, sulphate group, or sulfonate, alginic acids, celluloses, gums, etc. As a specific method of manufacturing anionic polysaccharide, polysaccharide having a carboxyl group can be manufactured by allowing an anionic agent such as chloroacetic acid to act on various types of polysaccharides. Examples of the commercial items of anionic polysaccharide are carboxymethyl celluloses (carboxymethyl cellulose and salt thereof, herein after referred to as "CMC"), alginic acids (alginic acid and salt thereof), xanthan gum, carboxymethyl guar gum, phosphorylated guar gum, carboxymethyl starch, and starch phosphate. Preferred anionic polysaccharide are CMC and alginic acids.

In the abovementioned component (B), the amphoteric acrylamide copolymer (referred to for convenience as "amphoteric PAM") is composed of (a) (meth)acrylamide, (b) cationic monomer, and (c) anionic monomer.

Examples of the abovementioned (meth)acrylamide (a) are acrylamide (abbreviated as AM) and/or methacrylamide.

The abovementioned cationic monomer (b) has intermolecularly one or plurality of cationic groups, and there are, for example, (meth)acrylamide containing a primary, secondary, or tertiary amino group, (meth)acrylate containing a primary, secondary, or tertiary amino group, (meth)acrylamide containing a quaternary ammonium salt group, (meth)acrylate containing a quaternary ammonium salt group, and diallyl dialkyl ammonium halide. For example, a typical example of monomer containing a quaternary ammonium salt group is a compound expressed by the following formula (1):

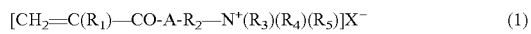

$$[CH_2=C(R_1)-CO-A-R_2-N^+(R_3)(R_4)(R_5)]X^- \qquad (1)$$

(where $R_1$ represents H or $CH_3$; $R_2$ represents an alkylene group having 1 to 3 carbons; $R_3$, $R_4$, and $R_5$ represent a hydrogen atom, an alkyl group having 1 to 3 carbons, a benzyl group, or $CH_2CH(OH)CH_2N^+(CH_3)_3X^-$, each of which may be the same or different; A represents O or NH; and X represents an anion such as halogen, alkyl sulphate.)

Preferred cationic monomer (b) are (meth)acrylamide containing a primary, secondary, or tertiary amino group, (meth)acrylate containing a primary, secondary, or tertiary amino group, (meth)acrylamide containing a quaternary ammonium salt group, and (meth)acrylate containing a quaternary ammonium salt group.

Examples of the abovementioned (meth)acrylamide containing a primary or secondary amino group are (meth)acrylamide containing a primary amino group such as aminoethyl(meth)acrylamide, and (meth)acrylamide containing a secondary amino group such as methylaminoethyl(meth)acrylamide, ethylaminoethyl(meth)acrylamide, and t-butylaminoethyl(meth)acrylamide. Typical examples of the abovementioned (meth)acrylamide containing a tertiary amino group are dialkylaminoalkyl(meth)acrylamide such as dimethylaminoethyl(meth)acrylamide, dimethylaminopropyl-(meth)acrylamide(dimethylaminopropylacrylamide is abbreviated as DMAPAA), and diethylaminoethyl(meth)acrylamide, diethylaminopropyl(meth)acrylamide.

Examples of the abovementioned (meth) acrylate containing a primary or secondary amino group are (meth)acrylate containing a primary amino group such as aminoethyl(meth)acrylate, and (meth)acrylate containing a secondary amino group such as methylaminoethyl(meth)acrylate, ethylaminoethyl(meth)-acrylate, t-butylaminoethyl(meth)acrylate. Typical examples of the abovementioned (metha)acrylate containing a tertiary amino group are dialkylaminoalkyl(meth)acrylate such as dimethylaminoethyl(meth)acrylate (dimethylamino-ethymethacrylate is abbreviated as DM), and dimethylaminopropyl(meth)acrylate, diethylaminoethyl-(meth)acrylate, and diethylaminopropyl(meth)acrylate.

The abovementioned (meth)acrylamide containing a quaternary ammonium salt group, or (meth)acrylate containing a quaternary ammonium salt group is a monomer containing a mono-quaternary salt group obtained by treating (meth)acrylamide containing a tertiary ammonium salt group or (meth)acrylate containing a tertiary ammonium salt group, with a quaterizing agent such as methyl chloride, benzyl chloride, methyl sulfate, or epichlorohydrine. There are, for example, acrylamidepropyl benzyl dimethylammonium chloride, methacryloyloxyethyl dimethyl benzyl ammonium chloride (abbreviated as DMBQ), acryloyloxyethyl dimethyl benzyl ammonium chloride, (meth)acryloyl aminoethyl trimethyl ammonium chloride, (meth)acryloyl aminoethyl triethyl ammonium chloride, (meth)acryloyloxyethyl trimethyl ammonium chloride, and (meth)acryloyloxyethyl triethyl ammonium chloride.

As a cationic monomer, a monomer containing a bis-quaternary base having intramolecularly two quaternary ammonium bases can be used from the viewpoint of achieving high molecular weight. The specific examples thereof are (meth)acrylamide containing a bis-quaternary base having two quaternary ammonium bases, and (meth)acrylate containing a bis-quaternary base. As (meth)acrylamide containing a bis-quaternary base, there is (meth)acrylamide containing a bis-quaternary base (abbreviated as DMAPAA-Q2), which can be obtained by allowing dimethyl amino propyl acrylamide to be reacted with 1-chloro-2-hydroxylpropyl trimethylammonium chloride. The DMAPAA-Q2 is a compound corresponding to the general formula (1) of the abovementioned cationic monomer, where $R_1$ represents H, $R_2$ represents a propylene group, A represents NH, $R_3$ and $R_4$ represent a methyl group, $R_5$ represents $CH_2CH(OH)CH_2N^+(CH_3)_3Cl^-$, and X represents chlorine.

On the other hand, diallyldialkyl ammonium haride that belongs to the abovementioned cationic monomer containing a quaternary ammonium base is, for example, diallyldimethyl ammonium chloride.

The anionic monomer (c) that is the unit of the abovementioned amphoteric PAM is $\alpha,\beta$-unsaturated carboxylic acids or $\alpha,\beta$-unsaturated sulfonic acids. The $\alpha,\beta$-unsaturated carboxylic acids are (meth)acrylic acid (acrylic acid is abbreviated as AA), maleic acid (anhydride), fumaric acid, itaconic acid (abbreviated as IA), citraconic acid (anhydride), and sodium, potassium, and ammonium salts of abovementioned acids.

The abovementioned unsaturated sulfonic acids are vinyl sulfonic acid, (meth)allyl sulfonic acid, styrene sulfonic acid, sulfopropyl(meth)acrylate, 2-(meth)acrylamide-2-methyl-propane sulfonic acid, and salt thereof.

In the amphoteric PAM, in addition to the abovementioned components (a) to (c), a crosslinking monomer (d) and/or a chain transfer agent (e) can also be used to impart a branched crosslinking structure to the copolymer.

The crosslinking monomer (d) functions to increase the molecular weight of the copolymer, and reduce the loss of the filler in the manufacturing step, particularly fine fibers and filler falling out of the wire mesh at the time of dehydration, thereby increasing the amount of the filler (the ash content) in paper. As the crosslinking monomer (d), it is possible to use, for example, bis(meth)acrylamides such as methylene-bis-acrylamide (abbreviated as MBAM) or ethylene-bis(meth)acrylamide, di(meth)acrylates such as ethylene glycol di(meth)acrylate or diethylene glycol di(meth)acrylate, dimethyl acrylamide (abbreviated as DMAM), or methacrylonitrile.

The abovementioned chain transfer agent has the functions of suppressing an increase in the viscosity of the copolymer, and increasing the branched structure to adjust the molecular weight. As the chain transfer agent, it is possible to use a known chain transfer agent, for example, isopropyl alcohol (abbreviated as IPA), methalyl sulfonic acid sodium (abbreviated as SMS), allyl sulfonic acid sodium (abbreviated as SAS), mercaptans such as n-dodecyl mercaptan, mercaptoethanol, thioglycolic acid, etc.

Additionally, in the amphoteric PAM, a nonionic monomer such as acrylonitrile may be used as needed, as other monomer.

The components (a) to (c) constituting the amphoteric PAM (A) can be used singularly or in combination.

The contents of the components (a) to (c) of the amphoteric PAM (A) can be set arbitrarily without any particular limitations. Preferably, the content of the (meth)acrylamide (a) is 65 to 98.8 mol %, the content of the cationic monomer (b) is 1 to 20 mol %, and the content of the anionic monomer (c) is 0.2 to 15 mol %, with respect to the copolymer.

On the other hand, the cationic acrylamide copolymer (referred to for convenience as cationic PAM) in the component (B) is composed of (meth)acrylamide (a) and a cationic monomer (b).

As these (meth)acrylamide (a) and cationic monomer (b), it is possible to use, needless to say, the components exemplified as the monomer constituting the abovementioned amphoteric PAM.

Also in the cationic PAM, in addition to the abovementioned components (a) and (b), the abovementioned crosslinking monomer (d) and/or the chain transfer agent (e) can be used to impart a branched crosslinking structure to the copolymer. Additionally, in the cationic PAM, a nonionic monomer such as acrylonitrile may be used as needed, as other monomer.

As in the case of the abovementioned amphoteric PAM, the components (a) and (b) of the cationic PAM can be used singularly or in combination.

The contents of the components (a) and (b) of the cationic PAM can be set arbitrarily without any particular limitations. Preferably, the content of the (meth)acrylamide (a) is 85 to 99 mol %, and the content of the cationic monomer (b) is 1 to 15 mol %, with respect to the copolymer.

The composite PAM can be manufactured by mixing the component (A) and the component (B), or alternatively subjecting the constitutive monomer of the component (B) to polymerization reaction in the presence of the component (A).

There are the following three combinations (1) to (3) of the components in the abovementioned mixing method.
 (1) An anionic polysaccharide and an amphoteric PAM;
 (2) An anionic polysaccharide and a cationic PAM;
 (3) An anionic polysaccharide, an amphoteric PAM and a cationic PAM By mixing the abovementioned component (A) and the component (B), polyion complex having both anionic, spreading structure of high molecular weight of polysaccharide and cationic, hydrophilic characteristics of acrylamide copolymer is formed.

On the other hand, the composite PAM can also be manufactured by allowing the component (A) to coexist when the component (B) is manufactured by subjecting the constituent monomer to copolymerization reaction, as in the case of polymerization method.

That is, the constituent monomers used when manufacturing the amphoteric or cationic PAM are (a) acrylamide, (b) a cationic monomer, and (c) an anionic monomer, as described above. The copolymerization reaction of these constituent monomers in the presence of the anionic polysaccharide brings into the state where the anionic polysaccharide coexists in the generated amphoteric or cationic PAM, thus enabling the two to form the polyion complex.

In other words, when the composite PAM of the invention is manufactured by subjecting the cationic or amphoteric PAM to copolymerization reaction, the anionic polysaccharide (A) may be added before or after the copolymerization reaction, as long as the polyion complex can be formed by the components (A) and (B).

In manufacturing the composite PAM of the invention, the mixing ratio (weight ratio) of the component (A) and the component (B) is preferably A/B=2 to 45/98 to 55, more preferably 4 to 30/96 to 70.

When the anionic polysaccharide (A) is greater than 45% by weight, anion is in excessive, and the surface coverage onto the filler is lowered. As a result, the particle size of the coated filler may not be increased properly, and the retention may also be lowered. Since the complex of two types having different charge characteristics is the feature of the present invention, the effect of the complexing is lowered when the anionic polysaccharide (A) is less than 2% by weight.

It is possible to use any known fillers singularly or in combination. There are, for example, inorganic fillers such as calcium carbonate, clay, silica, kaolin, magnesium carbonate, barium carbonate, barium sulfate, aluminium hydroxide, zinc oxide, and titanium oxide; and organic fillers such as urea-formaldehyde resin, melamine resin, polystyrene resin, and phenol resin. Preferred filler is calcium carbonate.

The coating process of the filler by using the abovementioned composite PAM is preferably carried out by adding the aqueous solution of the composite PAM to filler slurry. Alternatively, the two solutions of the components (A) and (B) may be separately added to the filler slurry.

The mean particle size of the coated filler is about 10 to 50 μm, preferably about 20 to 40 μm. If the particle size is far below the appropriate range, brightness can be increased, whereas it is difficult to increase paper strength. If the particle size is far above the appropriate range, paper strength can be increased, whereas brightness is lowered significantly.

The content of the coated filler to the total amount of the pulp slurry system after the coated filler is added thereto is preferably about 10 to 50% by weight. The content of the coating filler in the filled paper obtained by wet papermaking is 5 to 40% by weight, preferably 15 to 30% by weight.

In general, there are the following two methods of adding filler to pulp slurry. In batch adding method, after various types of agents such as paper strength agent and a sizing agent are added to pulp slurry, filler is added thereto batch wise before the step of diluting the pulp slurry with water. In fractional adding method, a part of filler (for example, about 30% of the total weight of the filler) is added at the initial stage before adding aluminium sulfate (including the case of adding paper broke, and the rest (for example, about 70% of the total weight of the filler) is added before the abovementioned diluting step (refer to Examples 1 and 10 to be described later). In the use of usual filler of the same amount, the fractional adding method may have lower paper strength than the batch adding method. By way of contrast, in the use of the coated filler of the invention, neither of the fractional adding method nor the batch adding method exerts a significant influence on paper strength. Hence, the present invention has the advantage that the filled paper whose paper strength variations is small irrespective of the adding method.

Needless to say, various types of agents, for example, paper strength agents such as cationic starch, acrylamide copolymer (PAM type polymer) and PVA type polymer, aluminium sulfate, sizing agents such as rosin resin, drainage agent, retention aid agent, water resistant agent, or ultra violet absorber, can be added to pulp slurry.

Preferably, paper strength agent such as cationic starch and the PAM type one is added to the pulp slurry. That is, the paper strength of the filled paper can be further improved by adding, to the pulp slurry, the paper strength agent such as cationic starch and/or the PAM type one, together with the coated filler of the invention.

A method of manufacturing filled paper will next be described. The basis for the method of the invention is that after the coating process of filler with a composite PAM, wet papermaking is performed by adding the coated filler to pulp slurry.

As described above, in the method of manufacturing the coated filler, in order to efficiently forming polyion complex, it is preferable to add the already prepared solution of the composite PAM to filler slurry, or alternatively the two solutions of the components (A) and (B) may be added separately to filler slurry.

As shown in the following examples, in the manufacture of filled paper, after a coated filler is prepared, it is necessary to add the coated filler to pulp slurry. Sufficient paper strength cannot be ensured by filled paper, which can be obtained merely by adding the component (A) and the component (B) to a large amount of pulp slurry (irrespective of the simultaneous or intermittent addition thereof).

The type of the filled paper of the invention is arbitrary without any particular limitations. There are, for example, base papers for such as wood free or wood containing printing papers, newsprint, art paper and cast-coated paper; and recording papers such as PPC paper, ink jet recording paper, laser printer paper, heat sensitive recording paper and pressure sensitive recording paper.

EXAMPLES

Examples of the manufacture of a composite PAM of the invention, examples of the manufacture of filler (calcium carbonate) coated with the composite PAM, examples of the manufacture of filled paper that contains the coated filler, and test examples of the paper strength, whiteness and sizing degree of the filled paper obtained in Examples will be described in sequence.

The present invention should not be restricted by the following manufacturing examples, Examples and test examples, and it is of course possible to make arbitrary modifications within the scope of the technical concept of the invention.

<Synthesis Examples of Various Types of Acrylamide Copolymers>

Synthesis examples of amphoteric or cationic acrylamide copolymers (referred to for convenience as PAM-2 to PAM-4) and an anionic acrylamide copolymer (referred to for convenience as PAM-5), as a raw material of a composite PAM of the invention, will be described below, along with a synthesis example of anionic polymer (PAA-1), and a synthesis example of a PAM (referred to as PAM-1) as the treating agent of filler or a paper strength agent (an internal agent).

(1) Synthesis Example 1

PAM-1: for Treating Filler, or an Internal Agent into Pulp Slurry

A mixture of 670 g of water, 262 g of the aqueous solution of acrylamide, 6.1 g of dimethylaminoethylmethacrylate, 6.1 g of dimethylaminopropylacrylamide, 3.8 g of itaconic acid, 0.1 g of methylenebisacrylamide and 0.5 g of sodium methallyl sulfonate was adjusted to pH3 by using a 10% sulfuric acid.

Subsequently, the temperature was raised to 60° C., and 16 g of 2% ammonium persulfate and 4 g of the aqueous solution of sodium sulfite were added thereto. This was then allowed to react at temperatures of 60 to 85° C. for three hours, thereby obtaining PAM-1 (an amphoteric acrylamide copolymer).

(2) Synthesis Examples 2 to 4

PAM-2 to PAM-4: the Amphoteric or Cationic PAM of the Invention

With the abovementioned synthesis example 1 as the basis, monomer components in the amount of addition, having the composition ratio shown in Table 1, were copolymerized to obtain PAM-2 and PAM-3 (each being amphoteric PAM), and PAM-4 (a cationic PAM).

(3) Comparative Synthesis Example 1

PAM-5: Agent for Treating Filler

With the abovementioned synthesis example 1 as the basis, monomer components in the amount having the composition ratio shown in Table 1, were copolymerized to obtain PAM-5 (an anionic PAM).

(4) Comparative Synthesis Example 2

PAA-1: Agent for Treating Filler

A mixture of 680 g of water, 103 g of acrylic acid and 0.8 g of sodium allyl sulfonate was adjusted to pH 3.5 by using a 10% sodium hydroxide.

Subsequently, the temperature was raised to 50° C., and 20 g of 2% ammonium persulfate and 6 g of the aqueous solution of sodium sulfite were added thereto. This was then allowed to react at temperatures of 50 to 85° C. for three hours, and adjusted to nearly a neutral pH by using sodium hydroxide, thereby obtaining PAA-1 (an anionic polymer).

The type and the mole ratio (%) of the monomers constituting the obtained PAM-1 to PAM-5 and the PAA-1, and the constant values of the copolymer are shown in Table 1.

TABLE 1

|  | Mole ratio of monomer composition | | | | Polymer constant | | |
| --- | --- | --- | --- | --- | --- | --- | --- |
|  | AM | Cationic monomer | Anionic monomer | Others | Solid (%) | pH | Viscosity (mPa · s) |
| Internal PAM | | | | | | | |
| PAM-1 | 94.5 | DM = 2 DMAPAA = 2 | IA = 1.5 | SMAS MBAM | 15.4 | 4.0 | 8,600 |
| Treating PAM | | | | | | | |
| PAM-2 | 93.5 | DMBQ = 2 DMAPAA = 3 | IA = 1.5 | SAS MBAM | 15.9 | 4.2 | 7,800 |
| PAM-3 | 86 | DMBQ = 4 DM = 6 | AA = 4 | SMAS | 15.3 | 4.1 | 4,200 |
| PAM-4 | 94 | DMBQ = 1 DM = 5 |  | SAS MBAM | 15.7 | 4.5 | 7,300 |
| PAM-5 | 80 |  | AA = 20 | SAS | 15.4 | 3.7 | 6,000 |
| PAA-1 |  |  | AA = 100 | SAS, NaOH | 15.7 | 6.5 | 4,100 |

TABLE 1-continued

| | Mole ratio of monomer composition | | | | Polymer constant | | |
|---|---|---|---|---|---|---|---|
| | AM | Cationic monomer | Anionic monomer | Others | Solid (%) | pH | Viscosity (mPa·s) |
| Composite PAM | | | | | | | |
| PAM-C15 | 89 | DMBQ = 8 DM = 2 | IA = 2 | CMC = 20 wt % SMAS | 15.1 | 4.1 | 3,600 |

AM: Acrylamide
DM: Dimethylaminoethylmethacrylate
DMAPAA: Dimethylaminopropylacrylamide
DMBQ: Methacryloyloxyethyldimethyl-benzyl ammonium chloride
IA: Itaconic acid
AA: Acrylic acid
SMAS: Sodium methallyl sulfonate
SAS: Sodium allyl sulfonate
MBAM: Methylenebisacrylamide
CMC: Carboxymethyl cellulose
Alg: Sodium alginate
CS: Cationic starch
PAA: Sodium polyacrylate <Manufacturing Examples of Composite PAM>

A description will be made of examples of manufacturing composite PAM-C1 to PAM-C11 and PAM-C13 by mixing the PAM-2 to PAM-5 obtained in the abovementioned synthesis examples 2 to 4 and the comparative synthesis example 1, with anionic polysaccharide (CMC or sodium alginate), respectively. That is, the PAM-C1 to PAM-C11 are the examples of manufacturing the composite PAMs by premixing the components (A) and (B) of the invention. The PAM-C12 shows a combination of products for separately adding to filler slurry, without premixing the PAM-2 and CMC. Namely, this is the example of forming the composite PAM after separately adding these to the filler slurry.

By way of contrast, a description will be made of an example of manufacturing PAM-C14 by mixing the PAM-3 (the amphoteric PAM) and the PAM-5 (the anionic PAM), without using the anionic polysaccharide, and an example of manufacturing PAA-C1 by mixing the anionic polymer of the abovementioned comparative synthesis example 2 and cationic starch.

The CMC used here was 0.75 in the degree of substitution, and 290 mPa·s in viscosity (a 1% solution).

(1) Manufacturing Example 1

PAM-C1

The CMC (anionic polysaccharide, being called component A) and the PAM-2 (component B) were made into a 1% aqueous solution, respectively, and these were mixed at a weight ratio of A/B=4/96, to obtain the PAM-C1 (a composite PAM). The PAM-C1 formed a polyion complex, and it became cloudy.

(2) Manufacturing Examples 2 to 11

PAM-C2 to PAM-C11

With the abovementioned manufacturing example 1 as the basis, these examples were manufactured by mixing two solutions of the component A and the component B shown in Table 2 at a predetermined ratio. In these cases, only the manufacturing example 5 (PAM-C5) employed sodium alginate (abbreviated as Alg), and other examples employed CMC, as the anionic polysaccharide.

(3) Manufacturing Example 12

PAM-C12

This shows a combination of two solutions kept still for separate addition to filler slurry, without premixing the PAM-2 and CMC.

(4) Comparative Manufacturing Example 1

PAM-C13

With the abovementioned manufacturing example 1 as the basis, this was manufactured by mixing two solutions of anionic polysaccharide as shown in Table 2, and the anionic PAM (PAM-5) of the abovementioned comparative synthesis example 1 at a predetermined ratio.

(5) Comparative Manufacturing Example 2

PAM-C14

With the abovementioned manufacturing example 1 as the basis, this was manufactured by mixing the amphoteric PAM (PAM-3) of the abovementioned synthesis example 3 and the anionic PAM (PAM-5) of the above mentioned comparative synthesis example 1, as shown in Table 2, without using the anionic polysaccharide (CMC).

(6) Comparative Manufacturing Example 3

PAA-C1

This was an example in conformity with the patent document 6 described earlier. Namely, with the abovementioned manufacturing example 1 as the basis, this was manufactured by mixing cationic starch and the anionic polymer (PAA-1) of the above mentioned comparative synthesis example 2, as shown in Table 2.

Table 2 shows the composition details and mixing ratio of the PAM-C1 to PAM-C14 and the PAA-C1.

TABLE 2

| Composite PAM | Anionic Polysaccharide (A) | PAM (B) | Ratio (A/B) |
|---|---|---|---|
| PAM-C1 | CMC | PAM-2 | 4/96 |
| PAM-C2 | | | 10/90 |
| PAM-C3 | | | 20/80 |
| PAM-C4 | | | 30/70 |
| PAM-C5 | Alg | PAM-2 | 15/85 |
| PAM-C6 | CMC | PAM-3 | 15/85 |
| PAM-C7 | | | 20/80 |
| PAM-C8 | | | 30/70 |
| PAM-C9 | CMC | PAM-4 | 10/90 |
| PAM-C10 | | | 20/80 |
| PAM-C11 | CMC | PAM-3 | 45/55 |
| PAM-C12 | CMC | PAM-2 | 15/85 |
| PAM-C13 | CMC | PAM-5 | 20/80 |
| PAM-C14 | | PAM-5 PAM-3 | 15/85 (B/B') |
| PAA-C1 | CS | PAA-1 | 90/10 |

On the other hand, the following is a manufacturing example 13 where in the presence of the anionic polysaccharide (CMC), a product obtained by subjecting the monomer component of acrylamide copolymer to polymerization reaction is brought into a composite PAM.

(7) Manufacturing Example 13

PAM-C15

A mixture of 680 g of water, 170 g of 50% aqueous solution of acrylamide, 4 g of dimethylaminoethylmethacrylate, 48 g of 60% methacryloyloxyethyldimethyl-benzylammonium chloride, 3.4 g of itaconic acid, 0.3 g of sodium methallyl sulfonate and 30 g of CMC was adjusted to pH3 by using a 10% sulfuric acid.

Subsequently, the temperature was raised to 62° C., and 12 g of the aqueous solution of 2% ammonium persulfate and 2.5 g of the aqueous solution of sodium sulfite were added thereto. This was then allowed to react at temperatures of 60 to 85° C. for three hours, thereby obtaining a cloudy composite PAM-C15.

The composition details and the constant of the PAM-C15 are shown in the lowermost column of Table 1.

A description will next be made of process examples where filler (calcium carbonate) was treated with the composite PAM obtained in the abovementioned manufacturing examples 1 to 13 (provided that in the manufacturing example 12, the components (A) and (B) are not yet mixed), or the composite components obtained by the comparative manufacturing examples 1 to 3, respectively.

<Examples of Filler Coating Process with Composite PAM>

In the following coating process examples 1 to 13, the coating process example 12 was a two-step process example where the two solutions of the component (A) and the component (B) were separately added to filler slurry, and the coating process of the filler with the composite PAM was carried out in the filler slurry. All of the rest of the coating process examples were batch process examples where the two solutions of the component (A) and the component (B) were premixed to prepare a composite PAM, which was then added to filler slurry.

(1) Coating Process Examples 1 to 11 and 13

A 4 g of precipitated calcium carbonate (TNC, manufactured by TOYO DENKA KOGYO, 3.5 μm in particle size) was added to 46 g of water, and sufficiently dispersed by an agitator.

Each 30 g of diluent of a composite PAM was prepared by adding water to a predetermined amount of the individual PAMs of the manufacturing examples 1 to 11 and 13, each being diluted to 0.5%, respectively. Each diluent was added with agitation to the dispersed solution of calcium carbonate, thereby obtaining the dispersed solution of calcium carbonate subjected to a 5% concentration coating process.

(2) Coating Process Example 12

The coating process was carried out in the same manner as in the batch process method, except that CMC and PAM-2, each being diluted to 0.5%, were added separately in two steps at the ratio shown in the PAM-C12 in Table 2, to the dispersed solution of calcium carbonate, instead of the abovementioned process examples 1 to 11, and 13 (the batch process method).

(3) Comparative Coating Process Examples 1 to 3

With the above mentioned coating process examples 1 to 11 as the basis, a dispersed solution was obtained by treating filler with the composite component of the comparative manufacturing example 1 (the combination of the CMC and the anionic PAM), the composite component of the comparative manufacturing example 2 (the combination of the amphoteric PAM and the anionic PAM), or the composite component of the comparative manufacturing example 3 (the combination of the cationic starch and the anionic polymer), respectively, instead of the composite PAM.

Here, a description will be made of manufacturing examples of filled paper where the treated individual dispersed solution of calcium carbonate obtained in the abovementioned coating process examples 1 to 13 and the comparative coating process examples 1 to 3 were added to pulp slurry, respectively.

<Examples of Manufacture of Filled Paper>

As shown in Table 3, Examples 1 to 9, and Comparative Examples 3 and 4 were examples where no PAM type paper strength agent was added to pulp slurry, as an internal agent. As shown in Table 4, Examples 10 to 20, Comparative Examples 1 and 2, and Comparative Examples 5 to 14 were examples of adding a PAM type paper strength agent. In all of these Examples and Comparative Examples, cationic starch (paper strength agent or retention aid agent) was added to the pulp slurry as the internal agent.

In Examples 1 to 9, Examples 1 to 3 were examples of changing the treating amount of the composite PAM (PAM-C3) to calcium carbonate, and Examples 4 to 9 were examples of changing the type of the composite PAM, while fixing the treating amount (0.2% by weight) to calcium carbonate. Similarly, Examples 10 to 12 were examples of changing the treating amount of the composite PAM (PAM-C2) to calcium carbonate, and Examples 13 to 20 were examples of changing the type of the composite PAM, while fixing the treating amount (0.2% by weight) to calcium carbonate. Example 18 is a manufacturing example of filled paper of the composite PAM containing the anionic polysaccharide (CMC) to the upper limit (45% by weight) of the suitable addition range. Example 19 was an example of the two-step process of separately adding the two solutions of the components (A) and (B) to filler slurry. All of the rest of the examples were batch process examples where the two solutions of the components (A) and (B) were premixed and then added to filler slurry.

Whereas in Comparative Examples 1 to 14, as shown in Table 3, Comparative Examples 1 and 2 were blank examples of using usual filler (calcium carbonate), instead of the coated filler. Similarly, as shown in Table 4, Comparative Examples 13 and 14 were blank examples of increasing the amount of addition of a PAM type paper strength agent for internal use. Comparative Example 3 was an example of treating filler only with the amphoteric PAM (PAM-1), without using any anionic polysaccharide. Comparative Example 4 was an example of using usual filler, without adding any PAM type paper strength agent.

Comparative Example 5 was an example of treating with the composite PAM (PAM-C13) composed of anionic polysaccharide (CMC) and the anionic PAM (PAM-5). Comparative Example 6 was an example of treating with a composite component of an anionic PAM and an amphoteric PAM. Comparative Example 7 was an example of treating only with the amphoteric PAM (PAM-1), without using any anionic polysaccharide.

In contrast, Comparative Examples 8 and 9 were examples of using filler treated only with anionic polysaccharide (CMC), by using neither the amphoteric nor the cationic PAM. Comparative Example 8 was an example of having a low concentration of CMC, whereas Comparative Example 9 was an example of having a high concentration thereof.

Comparative Examples 10 and 11 were examples in conformity with the patent document 6 described earlier. That is, Comparative Example 10 was an example of treating filler with a cationic starch (abbreviated as CS), and Comparative Example 11 was an example of treating filler with a composite component of a cationic starch and an anionic polymer (PAA-C1). Comparative Example 12 was an example where filler was not treated in advance with a composite PAM, and filler and anionic polysaccharide (CMC) and an amphoteric PAM (PAM-2) were merely separately added to pulp slurry (provided that the ratio of addition of the CMC and the amphoteric PAM, CMC/PAM-2=10/90).

In the abovementioned Examples and Comparative Examples, the treated calcium carbonate was added by the abovementioned fractional adding method.

In each left half part of Table 3 and Table 4, the type of treating agents used for treating the filler, and the amount of addition of internal agents (PAM type treating agents) are collectively shown.

(1) Example 1

A 8 g of 5% treated calcium carbonate dispersed solution (amounting 29% of the total amount of calcium carbonate), which was treated to be 0.35% by weight with PAM-C3 (Manufacturing Example 3) (per weight of calcium carbonate, and corresponding to 0.1% by weight with respect to dry paper stock), was added to 170 g of 2% slurry of bleached kraft pulp (LBKP, CSF 410 ml). This was agitated for two minutes, and then 1.5% by weight (per weight of the dry paper stock) of aluminium sulfate was added thereto.

After 30 seconds, 0.8% by weight (per dry paper stock) of gelatinized 1% aqueous solution of cationic starch was added. After one minute, 0.4% % by weight (per dry paper stock) of the aqueous solution of sizing agent was added. After a minute and 15 seconds, 20 g (amounting 71% of the total amount of calcium carbonate) of 5% treated calcium carbonate dispersed solution and 150 g of water were successively added. After a minute and 30 seconds, 100 ppm (per dry paper stock) of retention aid agent was added. After two minutes, the agitation was stopped to terminate the preparation.

The prepared pulp slurry was made into a sheet by a square type sheet machine (25 cm×25 cm, wire: 80 mesh). After its moisture content was adjusted by press, the sheet was dried by a drum dryer to make a sheet sample (filled paper) so as to achieve a target weighing of 72 g/m² and a paper ash content of 24% by weight.

After this sheet was left at a thermostatic chamber of 23° C./50% RH for 24 hours, the paper quality thereof was measured (This is common in the following examples and comparative examples). The results of the measurements are shown in Table 3.

(2) Examples 2 to 9

With Example 1 as the basis, each sheet sample was obtained by the same operation as in Example 1, except for the use of coated calcium carbonate prepared by changing the type and the amount of addition of a composite PAM as shown in Table 3.

(3) Comparative Example 1

A 8 g of 5% untreated calcium carbonate dispersed solution (amounting 29% of the total amount of calcium carbonate) was added to 170 g of 2% slurry of bleached kraft pulp (LBKP, CSF 410 ml). This was agitated for two minutes, and then 1.5% by weight (per dry paper stock) of 5% aluminium sulfate was added.

After 30 seconds, 0.8% by weight (per dry paper stock) of gelatinized 1% aqueous solution of cationized starch was added, and then after 45 seconds, 0.1% by weight (per dry paper stock) of 1% aqueous solution of PAM-1 was added. After one minute, 0.4% by weight (per dry paper stock) of the aqueous solution of sizing agent was added. After a minute and 15 seconds, 20 g (amounting 71% of the total amount of calcium carbonate) of 5% untreated calcium carbonate dispersed solution and 150 g of water were successively added. After a minute and 30 seconds, 100 ppm (per dry paper stock) of retention aid agent was added. After two minutes, the agitation was stopped to terminate the preparation.

The prepared pulp slurry was made into a sheet in the same manner as in Example 1, and a sheet sample was obtained.

(4) Comparative Example 2

With Comparative Example 1 as the basis, a sheet sample was obtained by the same operation as in Comparative Example 1, except that the amount of addition of the internal paper strength agent PAM-1 was increased from 0.1% by weight to 0.2% by weight.

(5) Comparative Example 3

With Comparative Example 1 as the basis, a sheet sample was obtained by the same operation as in Comparative Example 1, except that the internal paper strength agent PAM-1 was not added, and the untreated calcium carbonate was replaced with calcium carbonate treated with the abovementioned PAM-1 so as to be 0.7% by weight (per the weight of calcium carbonate, and corresponding to 0.2% by weight with respect to dry paper stock).

(6) Comparative Example 4

With Comparative Example 1 as the basis, a sheet sample was obtained by the same operation as in Comparative Example 1, except that the internal paper strength agent PAM-1 was not added.

(7) Example 10

A 8 g of 5%-concentration treated calcium carbonate dispersed solution (amounting 29% of the total amount of calcium carbonate), which was treated in 0.35% by weight (per the weight of calcium carbonate) with PAM-C2 (Manufacturing Example 2) was added to 170 g of 2% slurry of bleached kraft pulp (LBKP, CSF 410 ml). This was agitated for two minutes, and then 1.5% by weight (per dry paper stock) of 5% aluminium sulfate was added thereto.

After 30 seconds, 0.8% by weight (per dry paper stock) of gelatinized 1% aqueous solution of cationic starch was added. After 45 seconds, 0.3% by weight (per dry paper stock) of the aqueous solution of 1% PAM-1 was added. After a minute, 0.4% by weight (per dry paper stock) of the aqueous solution of sizing agent was added. After a minute and 15 seconds, 20 g (amounting 71% of the total amount of calcium carbonate) of 5% treated calcium carbonate solution and 150 g of water were successively added. After a minute and 30 seconds, 100 ppm (per dry paper stock) of retention aid agent was added. After two minutes, the agitation was stopped to terminate the preparation.

The prepared pulp slurry was made into a sheet by the same operation as in Example 1, and a sheet sample was made.

(8) Examples 11 to 20

With Example 10 as the basis, each sheet sample was obtained by the same operation as in Example 10, except that the type and the amount of coated calcium carbonate, and the amount of internal paper strength agent were changed as shown in Table 4.

(9) Comparative Examples 5 to 11

With Example 10 as the basis, each sheet sample was obtained by the same operation as in Example 10, except that the type and the amount of treated coated calcium carbonate, and the amount of internal paper strength agent were changed as shown in Table 4.

(10) Comparative Example 12

With Comparative Example 1 as the basis, a sheet sample was obtained by the same operation as in Comparative Example 1, except that the three components of (untreated) calcium carbonate, CMC and PAM-2 were separately added to pulp slurry.

(11) Comparative Examples 13 and 14

With Comparative Example 1 as the basis, each sheet sample was obtained by the same operation as in Comparative Example 1, except that the amount of addition of the internal paper strength agent PAM-1 was increased as shown in Table 4.

<Test methods of Paper with High Content of Filler>

The tests of the following items (1) to (6) were conducted on the respective filled papers obtained in Examples 1 to 20, and Comparative Examples 1 to 14.

(1) Breaking length (km): Measurement was made based on JIS P8113.

(2) Ash content (% by weight): Measurement was made based on JIS P 8128, and ashing was carried out at 525° C. for two hours.

(3) Brightness degree (%): Based on JIS P8123, measurement was made with a Hunter brightness meter (an automatic Hunter brightness and light meter, manufactured by Kumagai Riki Kogyo Co., Ltd.).

(4) Particle size (μm): By a laser-diffraction/diffusion particle-size distribution-analyzer (LA-920, manufactured by Horiba Seisakusho Co., Ltd.), the mean particle size in 50% by volume was measured on filler untreated or treated with the composite PAM or the like.

(5) Stockigt sizing degree (second): Measurement was made based on JIS P 8122.

The right-hand column of Table 3 and the right half column of Table 4 show the results of these measurements.

TABLE 3

|  | Treating agent | | Internal agent | | Breaking length(km) | Ash content (%) |
|---|---|---|---|---|---|---|
|  | Agent | Amount(%) | Agent | Amount(%) |  |  |
| Example-1 | PAM-C3 | 0.1 |  |  | 2.13 | 24.3 |
| Example-2 | PAM-C3 | 0.2 |  |  | 2.35 | 24.1 |
| Example-3 | PAM-C3 | 0.3 |  |  | 2.45 | 23.8 |
| Example-4 | PAM-C1 | 0.2 |  |  | 2.42 | 23.9 |
| Example-5 | PAM-C2 | 0.2 |  |  | 2.44 | 24.3 |
| Example-6 | PAM-C4 | 0.2 |  |  | 2.36 | 24.4 |
| Example-7 | PAM-C7 | 0.2 |  |  | 2.39 | 24.0 |
| Example-8 | PAM-C10 | 0.2 |  |  | 2.34 | 23.7 |
| Example-9 | PAM-C15 | 0.2 |  |  | 2.41 | 23.9 |
| Comp. Ex.-1 |  |  | PAM-1 | 0.1 | 2.02 | 23.6 |
| Comp. Ex.-2 |  |  | PAM-1 | 0.2 | 2.10 | 23.9 |
| Comp. Ex.-3 | PAM-1 | 0.2 |  |  | 2.18 | 23.2 |
| Comp. Ex.-4 |  |  |  |  | 1.82 | 23.6 |

*Addition of Calcium carbonate = 30%, aluminium sulfate = 1.5%, CS = 0.8% and retenti agent = 100 ppm were fixed in all examples.

TABLE 4

|  | Treating agent | | Internal agent | | Breaking length (km) | Brightness (%) | Sizing degree (sec.) | Particle Size (um) |
|---|---|---|---|---|---|---|---|---|
|  | Agent | Amount(%) | Agent | Amount(%) |  |  |  |  |
| Example-10 | PAM-C2 | 0.1 | PAM-1 | 0.3 | 2.60 | 82.3 | 7.3 | 23.5 |
| Example-11 | PAM-C2 | 0.2 | PAM-1 | 0.2 | 3.00 | 81.5 | 8.2 | 34.9 |
| Example-12 | PAM-C2 | 0.3 | PAM-1 | 0.1 | 2.74 | 81.8 | 8.8 | 19.4 |
| Example-13 | PAM-C3 | 0.2 | PAM-1 | 0.2 | 2.66 | 82.0 | 8.1 | 32.4 |

TABLE 4-continued

|  | Treating agent | | Internal agent | | Breaking length (km) | Brightness (%) | Sizing degree (sec.) | Particle Size (um) |
|---|---|---|---|---|---|---|---|---|
|  | Agent | Amount(%) | Agent | Amount(%) | | | | |
| Example-14 | PAM-C5 | 0.2 | PAM-1 | 0.2 | 2.86 | 81.6 | 8.3 | 30.9 |
| Example-15 | PAM-C6 | 0.2 | PAM-1 | 0.2 | 2.91 | 81.3 | 8.5 | 31.4 |
| Example-16 | PAM-C8 | 0.2 | PAM-1 | 0.2 | 2.80 | 81.7 | 8.2 | 24.7 |
| Example-17 | PAM-C9 | 0.2 | PAM-1 | 0.2 | 2.74 | 82.1 | 7.8 | 32.1 |
| Example-18 | PAM-C11 | 0.2 | PAM-1 | 0.2 | 2.78 | 81.8 | 7.5 | 21.2 |
| Example-19 | PAM-C12 | 0.2 | PAM-1 | 0.2 | 2.89 | 82.0 | 7.9 | 31.7 |
| Example-20 | PAM-C15 | 0.2 | PAM-1 | 0.2 | 2.87 | 81.6 | 8.5 | 24.6 |
| Comp. Ex.-5 | PAM-C13 | 0.2 | PAM-1 | 0.2 | 2.16 | 81.8 | 7.6 | 12.1 |
| Comp. Ex.-6 | PAM-C14 | 0.2 | PAM-1 | 0.2 | 2.52 | 81.2 | 7.9 | 18.8 |
| Comp. Ex.-7 | PAM-1 | 0.2 | PAM-1 | 0.2 | 2.58 | 80.7 | 5.8 | 20.5 |
| Comp. Ex.-8 | CMC | 0.05 | PAM-1 | 0.35 | 2.49 | 81.8 | 6.0 | 6.5 |
| Comp. Ex.-9 | CMC | 0.2 | PAM-1 | 0.2 | 2.26 | 82.3 | 4.1 | 3.7 |
| Comp. Ex.-10 | CS | 0.2 | PAM-1 | 0.2 | 1.98 | 82.8 | 4.9 | 28.5 |
| Comp. Ex.-11 | PAA-C1 | 0.2 | PAM-1 | 0.2 | 2.12 | 82.3 | 5.8 | 31.3 |
| Comp. Ex.-12 | | | PAM-2 | 0.18 | 2.08 | 82.7 | 7.4 | 3.5 |
| Comp. Ex.-13 | | | CMC | 0.02 | | | | |
| Comp. Ex.-14 | | | PAM-1 | 0.2 | | | | |
| Comp. Ex.-15 | | | PAM-1 | 0.4 | 2.38 | 82.2 | 6.2 | 3.5 |
| Comp. Ex.-16 | | | PAM-1 | 0.6 | 2.72 | 82.0 | 4.5 | 3.5 |

*Addition of Calcium carbide = 30%, aluminium sulfate = 1.5%, CS = 0.8% and yield agent = 100 ppm were fixed in all examples.

Referring first to Table 4, the usual fillers not treated with the composite PAM (Comparative Examples 13 and 14) has a particle size of 3.5 μm, whereas the treated fillers (for example, Examples 10 and 11) have a particle size of 23.5 to 34.9 μm. It will thus be seen that the particle size can be appropriately will thus be seen that the particle size can be appropriately increased by the aggregation of the filler.

In Comparative Examples 13 and 14, a large amount of the PAM-1 (the internal agent) was added (0.4% by weight or 0.6% by weight), and therefore these had a lower sizing degree than Comparative Example 5 or 6.

Referring to Table 3, Comparative Example 4 is an example where in addition to the usual filler (calcium carbonate), only cationic starch was added as the internal agent, and the PAM type paper strength agent was not added, whereas Comparative Examples 1 and 2 are examples where the usual filler was used, and the PAM type paper strength agent was added (as a result, Comparative Examples 1 and 2 had enhanced paper strength (breaking length) than Comparative Example 4).

A comparison of Examples 1 to 9 with Comparative Examples 1, 2 and 4 indicates that Examples 1 to 9 (containing no PAM type paper strength agent) had a large breaking length and enhanced paper strength, and the retention of ash content was substantially improved. In particular, it was found that Examples 1 to 9, each containing the filler treated with the composite PAM (without adding the PAM type paper strength agent) significantly enhanced paper strength than Comparative Example 4, and were able to improve more effectively paper strength than Comparative Example 1 or 2, each containing the PAM type paper strength agent.

Further, when compared with Comparative Example 3 using the filler treated only with the PAM-1, it was confirmed that Examples 1 to 9 had superior evaluations in paper strength and ash content, and therefore the filler treated with the composite PAM of the invention effectively contributed to the improvement of paper strength and the like.

Examples and Comparative Examples shown in Table 4 are examples where a PAM type paper strength agent (and cationic starch) is used as an internal agent.

Comparative Example 5 was the example where the filler was treated with the composite component of the CMC and the anionic PAM. Comparative Example 6 was the example of treating with the composite component of the anionic PAM and the amphoteric PAM. Comparative Example 7 was the example of treating only with the amphoteric PAM (PAM-1). Comparative Examples 8 and 9 were the examples of treating only with the CMC. It was found that Examples 10 to 18 was significantly improved in paper strength (breaking length), and not inferior in brightness degree and sizing degree, by comparison with these comparative examples. In particular, the improvement of paper strength can also be backed up by the fact that the particle size of treated filler in Examples 10 to 18 are substantially appropriately increased (aggregated).

Consider now Comparative Examples 8 and 9. It can be seen that in Comparative Example 8, the concentration of the CMC is as low as 0.05% by weight, and the paper strength of Comparative Example 8 is higher than that of Comparative Example 9 (0.2% by weight in CMC concentration), however, significantly lower than that of Examples 10 to 20. This proves the following. That is, because CMC has a high anionic charge density, if CMC is solely used in filler, its small amount can bring the charge of the system into excess anion. In a high concentration, the surface coverage of CMC onto the filler surface may be considerably lowered, and only a relatively low paper strength improving effect as the treating agent can be expected in an extremely limited low concentration range.

Comparative Example 11 was the example of treating filler with the composite component of cationic polymer (cationized starch) and anionic polymer (sodium polyacrylate), which was in conformity with the patent document 6 described earlier. It can be seen that the paper strength of Comparative Example 11 is significantly inferior to that of Examples 10 to 18. The present invention has the feature that the effective paper strength improvement with smaller amounts of agents can be achieved by the composite process of filler with the specific two types of polymers having different charge characteristics. In view of the comparison with Comparative Example 11, it is backed up that it is difficult to achieve the abovementioned effect only by selecting, for example, an arbitrary combination of cationic polymer and anionic polymer, and it is therefore necessary to select a combination of specific two types of polymers, as described in the present invention. For reference, the paper strength of Comparative Example 10 (1.98 km), where the filler was treated only with the cationic polymer (cationized starch) in conformity with the patent document 6, was further inferior to that of Comparative Example 11 (2.12 km).

On the other hand, Comparative Example 12 was similar to the present invention in use of the components (A) CMC and (B) PAM-2 of the invention, and the filler. However, Comparative Example 12 was the example where the abovementioned three components were merely added in a large capacity of pulp slurry, without pretreating the filler with the composite PAM composed of the components (A) and (B), as in the present invention. It could be confirmed that the paper strength of Comparative Example 12 (2.08 km) was substantially the same level as Comparative Example 2 where the filler and the PAM type paper strength agent were added, and remarkably inferior to that of Examples 10 to 20. Hence, it could be backed up that the exhibition of the effect of the present invention requires, prior to the addition of pulp slurry, the pretreatment of the filler with the composite PAM composed of the components (A) and (B) (this preparation may be carried out by adding the composite PAM solution to filler slurry, or alternatively, separately adding the two solutions of the components (A) and (B) to filler slurry).

Consider in detail Examples 10 to 20 in Table 4. Based on the component A, the mixing ratio of the components (A) and (B) is more preferably 5 to 30% by weight. Examples, which used the composite PAMs (PAM-C2 to PAM-C10, and PAM-C12) within this ratio, respectively, exhibited excellent paper strength. On the other hand, even in Example 18, which used the composite PAM being out of this ratio (particularly, PAM-C11 where A/B=45/55), the paper strength of a practical level could be maintained sufficiently.

With regard to the composite PAM component for treating the filler, the paper strength of Example 17 as the combination of anionic polysaccharide and cationic PAM (i.e. PAM-C9) was not inferior to that of other examples as the combination of anionic polysaccharide and amphoteric PAM. The paper strength of Example 14 using the PAM-C5, where the anionic polysaccharide was alginic acid, was also not inferior to that of other examples (where the anionic polysaccharide was CMC).

With regard to the method of manufacturing the composite PAM, the paper strength of Example 20 using the PAM-C15, which was the product obtained by subjecting the constituent monomer of amphoteric PAM to polymerization reaction in the presence of anionic polysaccharide, was also not inferior to that of other examples (where the preparation was made by mixing the components (A) and (B)).

With regard to the coating process of the filler, the paper strength of Example 19 (PAM-C12) employing the two-step process that the two solutions of the components (A) and (B) were separately added to the filler slurry, was also not inferior to that of other examples employing the one-step process that the composite PAM prepared in advance from the components (A) and (B) was added to the filler slurry.

The invention claimed is:

1. A method of manufacturing a filled paper comprising:
    the step of obtaining a coated filler which is coated with a composite acrylamide copolymer, by adding to a filler slurry an aqueous solution of the composite acrylamide copolymer consisting of (A) an anionic polysaccharide, and (B) an amphoteric acrylamide copolymer, wherein the weight ratio of the component (A) and the component (B) is A/B=2/98 to 45/55; and
    the step of performing wet papermaking by adding the coated filler to a pulp slurry.

2. The method of manufacturing a filled paper according to claim 1,
    wherein the (B) amphoteric acrylamide copolymer is composed of (a) (meth)acrylamide, (b) cationic monomer, and (c) anionic monomer, and
    wherein the (b) cationic monomer is (meth)acrylamide containing a primary, secondary, or tertiary amino group; (meth)acrylate containing a primary, secondary, or tertiary amino group; (meth)acrylamide containing a quaternary ammonium salt group; or (meth)acrylate containing a quaternary ammonium salt group.

3. The method of manufacturing a filled paper according to claim 1, wherein the anionic polysaccharide is an anionic cellulose.

4. The method of manufacturing a filled paper according to claim 1, wherein the filler is calcium carbonate.

5. The method of manufacturing a filled paper according to claim 1, wherein the content of the coated filler to the total amount of the pulp slurry system after the coated filler is added is 10 to 50% by weight.

6. The method of manufacturing a filled paper according to claim 1, wherein the pulp slurry comprises at least one paper strength agent selected from cationic starch and acrylamide copolymer.

7. The method of manufacturing a filled paper according to claim 3, wherein the anionic cellulose is selected from the group consisting of carboxylmethyl cellulose, alginic acid, anionic starch, and anionic gum.

* * * * *